(12) United States Patent
Matsunaga et al.

(10) Patent No.: US 8,522,644 B2
(45) Date of Patent: Sep. 3, 2013

(54) DRIVING FORCE CONTROL APPARATUS

(75) Inventors: Hitoshi Matsunaga, Anjo (JP); Yoji Takanami, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 350 days.

(21) Appl. No.: 13/001,889

(22) PCT Filed: Mar. 9, 2010

(86) PCT No.: PCT/JP2010/153888
§ 371 (c)(1),
(2), (4) Date: Dec. 29, 2010

(87) PCT Pub. No.: WO2011/111169
PCT Pub. Date: Sep. 15, 2011

(65) Prior Publication Data
US 2011/0219903 A1     Sep. 15, 2011

(51) Int. Cl.
*F16H 47/00* (2006.01)

(52) U.S. Cl.
USPC ............. 74/732.1; 74/733.1; 477/57; 477/63; 477/77; 477/168

(58) Field of Classification Search
USPC .......... 74/473.11, 730.1, 731.1, 732.1, 733.1; 477/5, 6, 53, 54, 57, 58, 62, 64, 63, 77, 79, 477/80, 83, 84, 168, 169, 176, 175; 180/305, 180/307, 53.4, 65.265, 65.275
See application file for complete search history.

(56) References Cited

U.S. PATENT DOCUMENTS

| | | | | |
|---|---|---|---|---|
| 5,005,687 A | * | 4/1991 | Kurihara et al. | 477/78 |
| 5,152,388 A | * | 10/1992 | Soda et al. | 477/77 |
| 6,881,170 B2 | * | 4/2005 | Onoyama et al. | 477/39 |
| 7,951,043 B2 | * | 5/2011 | Reisch et al. | 477/156 |
| 8,266,986 B2 | * | 9/2012 | Holmes et al. | 74/732.1 |
| 8,280,599 B2 | * | 10/2012 | Suzuki et al. | 701/54 |
| 2003/0203790 A1 | * | 10/2003 | Matsubara et al. | 477/107 |
| 2007/0078040 A1 | * | 4/2007 | Nobumoto et al. | 477/70 |
| 2009/0298644 A1 | * | 12/2009 | Nihei et al. | 477/107 |
| 2011/0239800 A1 | * | 10/2011 | Sekii et al. | 74/473.1 |
| 2011/0245034 A1 | * | 10/2011 | Yoshida et al. | 477/8 |

FOREIGN PATENT DOCUMENTS

| | | | |
|---|---|---|---|
| JP | 2000 320581 | | 11/2000 |
| JP | 2000320581 A | * | 11/2000 |
| JP | 2003 214210 | | 7/2003 |
| JP | 2004 3425 | | 1/2004 |

OTHER PUBLICATIONS

International Search Report issued Apr. 27, 2010 in PCT/JP10/053888 filed Mar. 9, 2010.

* cited by examiner

*Primary Examiner* — Troy Chambers
*Assistant Examiner* — Valentin Craciun
(74) *Attorney, Agent, or Firm* — Oblon, Spivak, McClelland, Maier & Neustadt, L.L.P.

(57) ABSTRACT

When shift transmission of an automatic transmission is performed in a free-run state, a driving force control apparatus controls a degree of engagement of an engaging device in accordance with a hydraulic difference between a first hydraulic pressure and a second hydraulic pressure in a condition that the first hydraulic pressure does not reach the second hydraulic pressure. As a result, an oil pump supplies a hydraulic pressure to the automatic transmission, and the shift transmission can be performed. The first hydraulic pressure is a hydraulic pressure of the automatic transmission. The second hydraulic pressure is a hydraulic pressure required to perform the shift transmission. The engaging device can adjust an extent of transmission power between an engine and the automatic transmission in accordance with the degree of engagement.

3 Claims, 5 Drawing Sheets

The number of revolutions of mechanical oil pump

DRIVING FORCE CONTROL APPARATUS

TECHNICAL FIELD

The present invention relates to a driving force control apparatus of a vehicle, such as an automobile, and relates particularly to a driving force control apparatus for performing driving force control in the inertia driving of the vehicle.

BACKGROUND ART

As this type of apparatus, there has been suggested an apparatus provided with: an engine; an automatic transmission having a main oil pump which rotates in synchronization with the output shaft of the engine; and an auxiliary oil pump for maintaining the operating oil pressure of the automatic transmission during the automatic stop of the engine (refer to a patent document 1). Here, in particular, there has been suggested a technique in which if the operating oil pressure of the automatic transmission drops to less than a predetermined value during the automatic stop of the engine, the engine is automatically restarted after the automatic transmission is changed into a neutral state, and the automatic transmission is changed into a state in which the driving force of the engine can be transmitted to drive wheels after the number of revolutions of the engine is increased to the predetermined number of revolutions.
Patent document 1: Japanese Patent Application Laid Open No. 2004-003425

DISCLOSURE OF INVENTION

Subject to be Solved by the Invention

If the engine is automatically stopped during the running of the vehicle, it is desirable to perform the shift transmission control of the automatic transmission in consideration of responsiveness at the restart of the engine. However, in the aforementioned background art, there is a possibility that the operating oil pressure of the automatic transmission is insufficient, which is technically problematic.

In view of the aforementioned problems, it is therefore an object of the present invention to provide a driving force control apparatus capable of appropriately performing the shift transmission control even if the vehicle is in a free-run state.

Means for Solving the Subject

The above object of the present invention can be achieved by a driving force control apparatus mounted on a vehicle, the driving force control apparatus provided with: an engine; an automatic transmission; an engaging device capable of adjusting an extent of transmission of power between the engine and the automatic transmission in accordance with a degree of engagement; an oil pump for generating a hydraulic pressure by rotation of a drive shaft of the engine; and a controlling device for controlling the degree of the engagement in accordance with a hydraulic difference between a first hydraulic pressure and a second hydraulic pressure in a condition that the first hydraulic pressure does not reach the second hydraulic pressure when shift transmission of the automatic transmission is performed in a free-run state in which the vehicle runs in a case where the engine is stopped and where the transmission of the power between the engine and the automatic transmission is blocked by the engaging device, wherein the first hydraulic pressure is a hydraulic pressure of the automatic transmission and the second hydraulic pressure is a hydraulic pressure required to perform the shift transmission.

According to the driving force control apparatus of the present invention, the driving force control apparatus is mounted on the vehicle such as an automobile. The engaging device such as a clutch can adjust the extent of the transmission of the power between the engine and the automatic transmission in accordance with the degree of the engagement.

The oil pump generates the hydraulic pressure by the rotation of the drive shaft of the engine. Specifically, for example, the oil pump is a trochoidal oil pump, provided with an inner rotor having trochoidal external teeth; and an outer rotor having internal teeth engaging with the external teeth. Then, if the inner rotor is rotationally driven with the rotation of the drive shaft of the engine, the outer rotor also rotates as the internal teeth engage with the external teeth, and the rotation of the both rotors results in the hydraulic pressure.

The controlling device, which is provided with a memory, a processor and the like, controls the degree of the engagement in accordance with the hydraulic difference between the first hydraulic pressure and the second hydraulic pressure in the condition that the first hydraulic pressure does not reach the second hydraulic pressure when the shift transmission of the automatic transmission is performed in the free-run state in which the vehicle runs in the case where the engine is stopped and where the transmission of the power between the engine and the automatic transmission is blocked by the engaging device, wherein the first hydraulic pressure is a hydraulic pressure of the automatic transmission and the second hydraulic pressure is a hydraulic pressure required to perform the shift transmission Here, the expression "... controls the degree of the engagement in accordance with the hydraulic difference between the first hydraulic pressure and the second hydraulic pressure" means controlling the degree of the engagement of the engaging device so as to achieve the number of revolutions of the drive shaft of the engine which allows the hydraulic pressure corresponding to the hydraulic difference between the first hydraulic pressure and the second hydraulic pressure to be generated in the oil pump.

Incidentally, the shift transmission of the automatic transmission in the free-run state means the shift transmission performed in a case where the run state of the vehicle goes beyond a predetermine up shift point or a predetermined down shift point associated with the automatic transmission, for example, due to a natural increase or decrease in the vehicle speed of the vehicle.

According to the study of the present inventors, the following matter has been found; namely, in the free-run state, the number of revolutions of the engine is zero in principle. In this case, the transmission of the power is blocked by the engaging device between the engine and the automatic transmission (i.e. the drive shaft side). Thus, from the viewpoint of a reduction in unavailable energy, it is desired that the shift transmission of the automatic transmission is not performed. However, in consideration of the restart of the engine, the shift transmission to a low transmission gear ratio is desirable at the stop of the engine. Incidentally, in order to perform the shift transmission of the automatic transmission, a relatively high hydraulic pressure and a relatively large flow volume of operating oil are required.

On the other hand, if the shift transmission of the automatic transmission is not performed, there likely arises problems in drivability, such as an insufficient driving force due to an inconsistency in a gear ratio at the reacceleration from the free-run state and a delay of the generation of the driving force due to the shift transmission of the automatic transmission performed simultaneously with the restoration from the free-run state.

As described above, the number of revolutions of the engine is zero in the free-run state, so that the oil pump, which generates the hydraulic pressure by the rotation of the drive shaft of the engine, cannot generate the hydraulic pressure in the free-run state. If it is attempted to generate the hydraulic pressure with an electrical oil pump when the shift transmission of the automatic transmission is performed in the free-run state, the necessary capacity of the electrical oil pump becomes relatively large and electric energy for driving the electrical oil pump becomes relatively large, which may deteriorate mileage in terms of an energy balance relation and which may increase manufacturing cost.

In the present invention, however, as described above, the degree of the engagement of the engaging device is controlled by the controlling device in accordance with the hydraulic difference between the first hydraulic pressure and the second hydraulic pressure in the condition that the first hydraulic pressure does not reach the second hydraulic pressure when the shift transmission of the automatic transmission is performed in the free-run state.

Thus, if the shift transmission of the automatic transmission is performed even in the free-run state, the hydraulic pressure necessary for the shift transmission is generated by a mechanical oil pump. Thus, it is possible to limit or control the deterioration in the electric energy and the increase in the manufacturing cost. Therefore, according to the driving force control apparatus of the present invention, it is possible to appropriately perform the shift transmission control even when the vehicle is in the free-run state.

In one aspect of the driving force control apparatus of the present invention, the controlling device further controls the degree of the engagement in accordance with the number of revolutions of the engine when controlling the degree of the engagement in accordance with the hydraulic difference.

According to this aspect, the controlling device further corrects the degree of the engagement in accordance with the number of revolutions of the engine when controlling the degree of the engagement in accordance with the hydraulic difference (i.e. the deficiency of the hydraulic pressure).

According to the study of the present inventors, it has been found that, for example, due to product variations, deterioration with time, and the like, the engagement force (i.e. the degree of the engagement) of the engaging device in arithmetic is likely different from the engagement force required in practice.

Thus, in the present invention, feedback control is performed while a difference between the current number of revolutions of the engine (i.e. actual value) and the control-target number of revolutions of the engine (i.e. theoretical value) is used as deviation, thereby to correct the engagement force of the engaging device. By this, the shift transmission control can be performed, more appropriately.

In another aspect of the driving force control apparatus of the present invention, it is further provided with a torque converter which is disposed between the engine and the engaging device and which has a lockup clutch, the controlling device further engaging the lockup clutch in a condition that the number of revolutions of the engine is zero when the vehicle moves into the free-run state.

According to this aspect, the torque converter having the lockup clutch is disposed between the engine and the engaging device. In other words, the input shaft of the torque converter is coupled with the drive shaft of the engine, and the output shaft of the torque converter is coupled with one end of the engaging device.

Here, the torque converter is provided with a lockup clutch, a pump impeller, a turbine liner, a stator, and the like. The lockup clutch is provided with a torque converter cover and a lockup piston. Moreover, the input shaft of the torque converter is connected to the pump impeller via the torque converter cover, and the output shaft of the torque converter is connected to the turbine liner and the lockup piston.

In this aspect, the oil pump is connected to the pump impeller of the torque converter via a coupling member. Therefore, the oil pump generates the hydraulic pressure by the rotation of the torque converter cover of the torque converter rotated due to the rotation of the drive shaft of the engine.

According to the study of the present inventors, it has been found that depending on the speed of the vehicle, even if the engaging device is completely engaged, there is a possibility that the number of revolutions of the oil pump cannot be reached to the target number of revolutions due to slipping in the torque converter.

In the present invention, however, the lockup clutch is engaged by the controlling device in the condition that the number of revolutions of the engine is zero when the vehicle moves into the free-run state. Thus, it is possible to prevent the sliding or slipping in the torque converter. As a result, according to this aspect, the number of revolutions of the oil pump can be reached to the target number of revolutions In another aspect of the driving force control apparatus of the present invention, the controlling device further controls the automatic transmission to reduce a shift transmission frequency in a condition that the vehicle is in the free-run state.

According to this aspect, the shift transmission frequency is reduced, so that it is possible to limit or control the consumption of the operating oil flow volume in the automatic transmission (i.e. it is possible to limit or control an opportunity for the oil pump to be operated in the free-run state of the vehicle), which is extremely useful in practice.

The operation and other advantages of the present invention will become more apparent from the embodiments explained below.

BEST MODE FOR CARRYING OUT THE INVENTION

Hereinafter, an embodiment of the driving force control apparatus of the present invention will be explained with reference to the drawings.

<First Embodiment>

Firstly, a first embodiment of the driving force control apparatus of the present invention will be explained with reference to FIG. 1 to FIG. 3.

The structure of the driving force control apparatus in this embodiment will be explained with reference to FIG. 1. FIG. 1 is a block diagram showing the structure of the driving force control apparatus in the first embodiment. In FIG. 1, a solid line indicates mechanical connection (coupling), a dotted line indicates a signal, and a dashed line indicates electrical connection. Incidentally, for convenience of explanation, FIG. 1 illustrates only a part directly related to this embodiment, and the illustration of other members is omitted.

Figure 1:
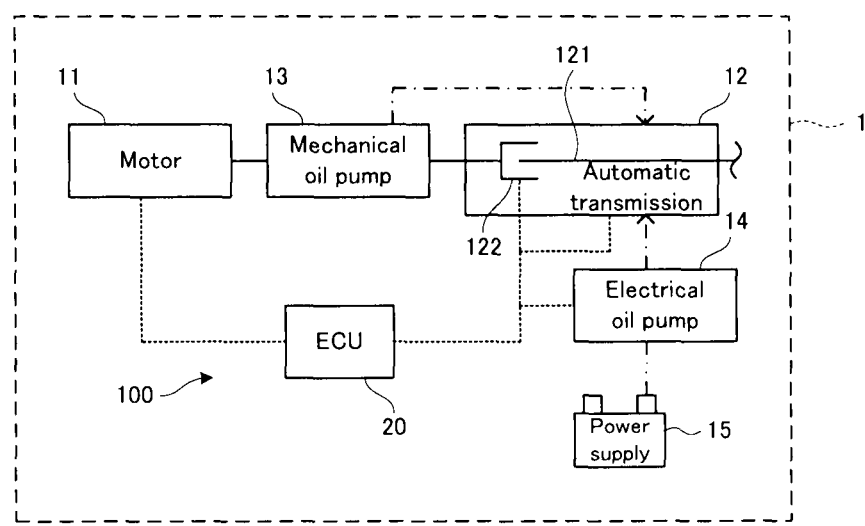
FIG. 1 is a block diagram showing the structure of a vehicle equipped with a driving force control apparatus in a first embodiment.

In FIG. 1, a driving force control apparatus 100, which is mounted on a vehicle 1, is provided with an engine (motor) 11, an automatic transmission 12, a mechanical oil pump 13, an electrical oil pump 14, an electrical storage apparatus (power supply) 15, and an ECU (Electronic Control Unit) 20.

The engine 11 is a main power source for the vehicle running, and it is made of an internal combustion engine, such as a gasoline engine and a diesel engine. Here, the engine 11 is provided with at least one of an alternator, an electronic throttle, a variable valve mechanism, and a variable compression ratio mechanism, which can change the characteristics of the engine 11.

An axle 121 of the automatic transmission 12 is coupled with the drive shaft of the engine 11, selectively, via an input clutch 122. Here, the input clutch 122 as one example of the "engaging device" is a hydraulic friction engaging apparatus, which is often used in a known vehicle transmission, and it is a wet type multiplate engaging apparatus in which mutually-stacked multiple friction plates are pressed by a hydraulic actuator.

The mechanical oil pump 13 as one example of the "oil pump" of the present invention is a trochoidal oil pump, provided with an inner rotor having trochoidal external teeth connected to the drive shaft of the engine 11; and an outer rotor having internal teeth engaging with the external teeth. If the inner rotor is rotationally driven with the rotation of the drive shaft of the engine 11, the outer rotor also rotates as the internal teeth engage with the external teeth, and the rotation of the both rotors results in a hydraulic pressure.

The electrical oil pump 14 is driven by electric power supplied from the electrical storage apparatus 15 such as a lead storage battery, and it supplies the hydraulic pressure to the automatic transmission 12 mainly in the free run of the vehicle 1. Here, the electrical oil pump 14 is an auxiliary oil pump, and its capacity is relatively small. Incidentally, the driving force control apparatus 100 may be also provided with a pressure storage apparatus which can maintain the hydraulic pressure of operating oil in the automatic transmission 12 for a certain period, instead of the electrical oil pump 14.

The ECU 20 as one example of the "controlling device" of the present invention controls the degree of engagement of the input clutch 122 in accordance with a hydraulic difference between a first hydraulic pressure and a second hydraulic pressure in the condition that the first hydraulic pressure does not reach the second hydraulic pressure when the shift transmission of the automatic transmission 12 is performed in the free-run state in which the vehicle 1 runs in a case where the engine 10 is stopped and where the transmission of power between the engine 10 and the automatic transmission 12 is blocked by the input clutch 122, wherein the first hydraulic pressure is the hydraulic pressure of the automatic transmission 12 and the second hydraulic pressure is a hydraulic pressure required to perform shift transmission.

Incidentally, the driving force control apparatus 100 is further provided with one or more rotation sensors (not illustrated) by which the rotational state of the inside of the automatic transmission 12 such as the vehicle speed of the vehicle 1, the number of revolutions of the engine 11, and the number of revolutions of the mechanical oil pump can be known.

In the embodiment, one portion of the various functions of the ECU 20 for electronic control of the vehicle 1 is used as one portion of the driving force control apparatus 100.

Next, with reference to a flowchart in FIG. 2, an explanation will be given on a process of engaging the input clutch 122 performed by the ECU 20, mainly during the running of the vehicle 1 equipped with the driving force control apparatus 100 as constructed above.

Figure 2:
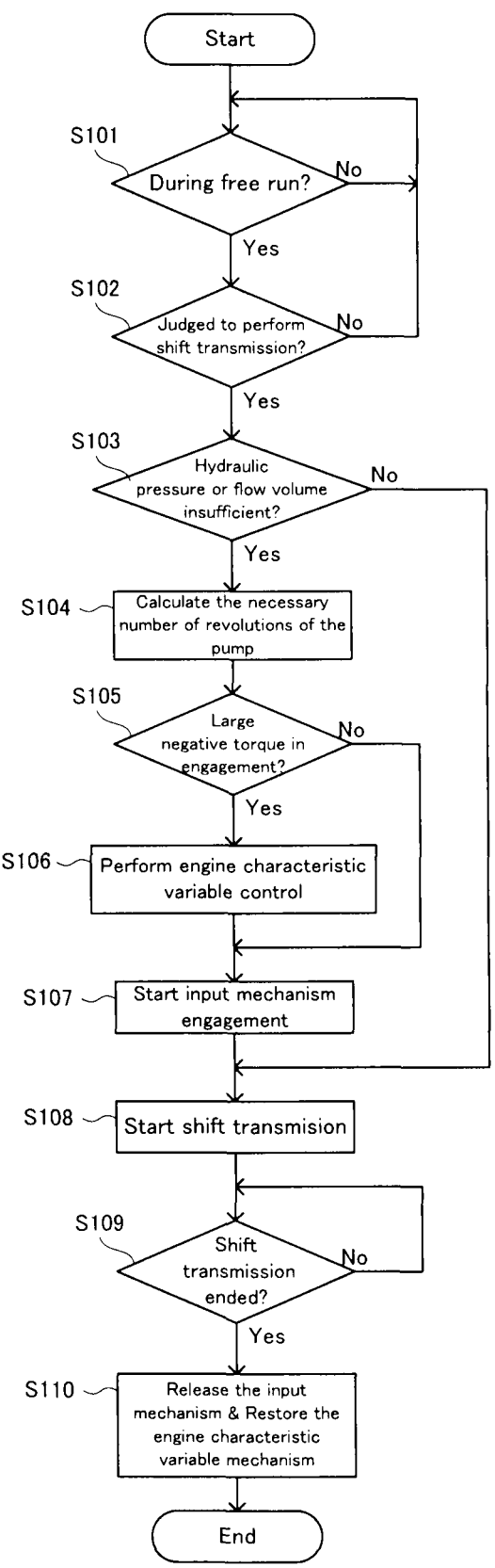
FIG. 2 is a flowchart showing a process of engaging an input clutch performed by an ECU, mainly during the running of the vehicle equipped with the driving force control apparatus in the first embodiment.
Figure 3:
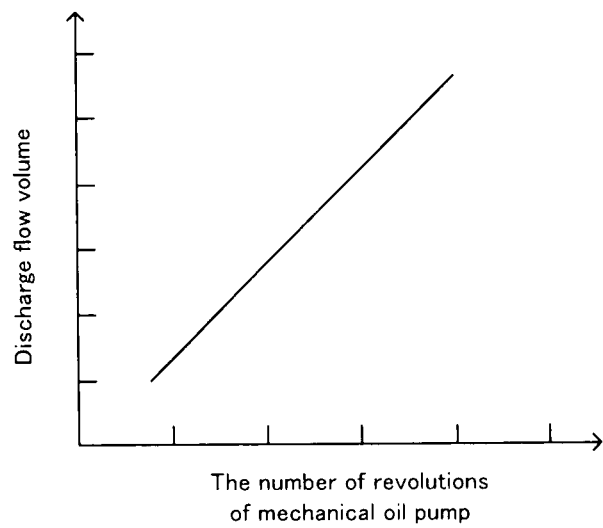
FIG. 3 is a characteristic diagram showing one example of a relation between the number of revolutions and the discharge flow volume of a mechanical oil pump.

In FIG. 2, firstly, the ECU 20 judges whether or not the vehicle 1 is in the free-run state (step S101). If it is judged that the vehicle 1 is not in the free-run state (the step S101: No), the ECU 20 performs the process in the step S101 again.

On the other hand, if it is judged that the vehicle 1 is in the free-run state (the step S101: Yes), the ECU 20 judges whether or not the shift transmission of the automatic transmission 12 is required, for example, on the basis of a shift transmission line associated with the automatic transmission 12, a current vehicle speed of the vehicle 1, or the like (step S102). If it is judged that the shift transmission of the automatic transmission 12 is not required (the step S102: No), the ECU 20 performs the process in the step S101.

On the other hand, if it is judged that the shift transmission of the automatic transmission 12 is required (the step S102: Yes), the ECU 20 judges whether or not the current hydraulic pressure or supply flow volume of the operating oil in the automatic transmission 12 is less than the hydraulic pressure or supply flow volume of the operating oil required to perform the shift transmission of the automatic transmission 12 (i.e. whether or not the hydraulic pressure or supply flow volume is insufficient) (step S103).

If it is judged that the current hydraulic pressure or supply flow volume of the operating oil in the automatic transmission 12 reaches the hydraulic pressure or supply flow volume of the operating oil required to perform the shift transmission of the automatic transmission 12 (i.e. if it is judged that only the electrical oil pump 14 can supply the hydraulic pressure or supply flow volume necessary for the shift transmission of the automatic transmission 12) (the step S103: No), the ECU 20 performs a process in a step S108 described later.

If it is judged that the current hydraulic pressure or supply flow volume of the operating oil in the automatic transmission 12 is less than the hydraulic pressure or supply flow volume of the operating oil required to perform the shift transmission of the automatic transmission 12 (the step S103: Yes), the ECU 20 calculates the number of revolutions of the mechanical oil pump 13 which is necessary to compensate for the deficiency of the hydraulic pressure and the supply flow volume (step S104).

Specifically, for example, firstly, the necessary discharge flow volume Q3 of the automatic transmission 12 is obtained as Q2-Q1, wherein Q1 is the maximum discharge flow volume of the electrical oil pump 14, and Q2 is the necessary flow volume required to generate a hydraulic pressure necessary for the shift transmission of the automatic transmission 12. Then, for example, from a relation between the number of revolutions and the discharge flow volume of the mechanical oil pump 13 as shown in FIG. 3, the necessary number of revolutions of the mechanical oil pump 13 is obtained. Incidentally, FIG. 3 is a characteristic diagram showing one example of the relation between the number of revolutions and the discharge flow volume of the mechanical oil pump.

In the step S104, the ECU 20 further determines the engagement force of the input clutch 122 from the calculated number of revolutions of the mechanical oil pump 13 and the current vehicle speed of the vehicle 1. In fact, the number of revolutions of the mechanical oil pump 13 is equal to the number of revolutions of the engine 11, so that it is necessary to consider various losses associated to the engine 11, such as a mechanical loss and a pump loss, with regard to the engagement force of the input clutch 122 required to achieve the calculated number of revolutions of the mechanical oil pump 13. Therefore, the final engagement force of the input clutch 122 is determined by calculating loss torque with respect to the target number of revolutions of the engine 11 (i.e. the calculated number of revolutions of the mechanical oil pump 13).

Incidentally, the loss torque is considered to include a mechanical loss by the rotation of the engine 11, a pump loss generated in four strokes of suction, compression, expansion and exhaust, a mechanical loss of the mechanical oil pump 13 directly connected to the engine 11, and inertia torque by a change in rotation. Therefore, if those losses are incorporated into the process of obtaining the engagement force of the input clutch 122 in a control model or map, the accurate (i.e. final) engagement force of the input clutch 122 can be obtained.

After the process in the step S104, the ECU 20 judges whether or not negative in the engagement of the input clutch 122 is large (step S105). If it is judged that the negative torque is not large (the step S105: No), the ECU 20 performs a process in a step S107 described later.

On the other hand, if it is judged that the negative torque is large (the step S105: Yes), the ECU 20 changes the characteristics of the engine 11, for example, by controlling at least one of the alternator, the electronic throttle, the variable valve mechanism, and the variable compression ratio mechanism. Specifically, for example, a pumping loss is reduced by reducing a compression ratio, by changing the lift amount or open/close timing of intake and exhaust valves, or by increasing the amount of throttle opening in the engagement of the input clutch 122. Incidentally, the ECU 20 determines the engagement force of the input clutch 122 again in accordance with the changed characteristics of the engine 11.

Then, the ECU 20 engages the input clutch 122 on the basis of the determined engagement force of the input clutch 122 (step S107) and then starts the shift transmission of the automatic transmission 12 (step S108).

Here, for example, due to product variations, deterioration with time, and the like, the engagement force of the input clutch 122 in arithmetic is likely different from the engagement force required in practice. Thus, in the embodiment, feedback control is performed while a difference between the current number of revolutions of the engine 11 and the control-target number of revolutions of the engine 11 is used as deviation, thereby to correct the engagement force of the input clutch 122.

Incidentally, the corrected engagement force obtained by the feedback control may be incorporated into learning control for reflecting it in next control. By this, it is possible to appropriately control the input clutch 122 from the beginning of the control.

Then, the ECU 20 judges whether or not the shift transmission of the automatic transmission 12 is ended (step S109). If it is judged that the shift transmission of the automatic transmission 12 is not ended (the step S109: No), the ECU 20 performs the process in the step S109 again.

On the other hand, if it is judged that the shift transmission of the automatic transmission 12 is ended (the step S109: Yes), the ECU 20 releases the input clutch 122 (step S110). Incidentally, the ECU 20 restores the characteristics of the engine 11 only if the characteristics of the engine 11 are changed in the process in the step S106.

As described above, when it is judged that the shift transmission of the automatic transmission 12 is ended, the instant release of the input clutch 122 allows the minimum necessary operation of the mechanical oil pump 13. This can result in a reduction in load of the input clutch 122, thereby reducing a sense of discomfort.

<Second Embodiment>

A second embodiment of the driving force control apparatus of the present invention will be explained with reference to FIG. 4 and FIG. 5. The second embodiment has the same structure as the first embodiment, except that a torque converter having a lockup is disposed between the engine and the automatic transmission. Thus, in the second embodiment, the explanation of overlap with the first embodiment will be omitted, and common parts in the drawings will carry the same reference numeral, and only basically different points will be explained with reference to FIG. 4 and FIG. 5.

Firstly, the structure of the driving force control apparatus in this embodiment will be explained with reference to FIG. 4. FIG. 4 is a conceptual view showing the structure of the torque converter which constitutes one portion of the driving force control apparatus in the second embodiment.

Figure 4:
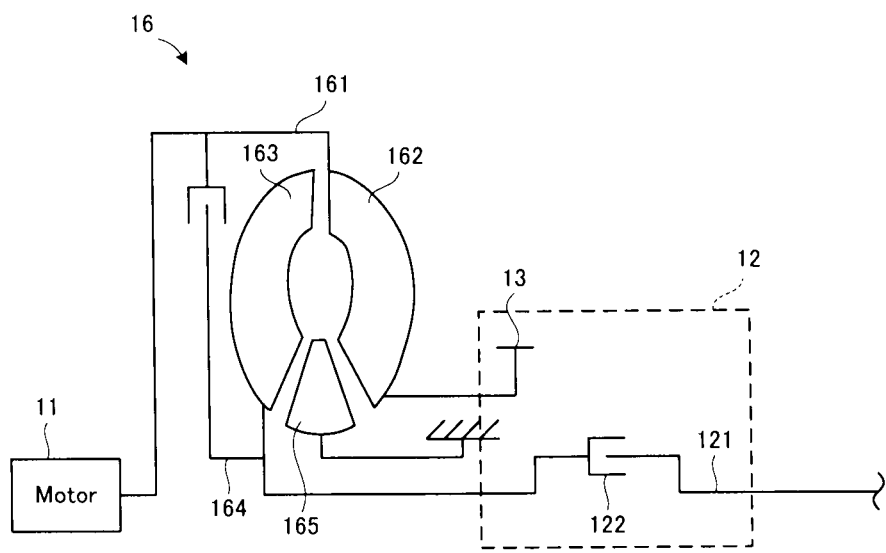
FIG. 4 is a conceptual view showing the structure of a torque converter which constitutes one portion of a driving force control apparatus in a second embodiment.

In FIG. 4, a torque converter 16 is provided with a lockup clutch, a pump impeller 162, a turbine liner 163, and a stator 165. The lockup clutch is provided with a torque converter cover 161 and a lockup piston 164.

The input shaft of the torque converter 16 is coupled with the drive shaft of the engine 11 on one end and is connected to the pump impeller 162 via the torque converter cover 161 on the other end. On the other hand, the output shaft of the torque converter 16 is coupled with the input clutch 122 on one end and is connected to the turbine liner 163 and the lockup piston 164 on the other end.

The stator 165 has, for example, a one-way clutch (not illustrated) and has a torque amplification function. The engagement and release of the lockup clutch are controlled by the hydraulic pressure of oil supplied to the torque converter 16. Incidentally, the number of revolutions of the output shaft of the torque converter 16 matches the number of turbine revolutions.

In the embodiment, the mechanical oil pump 13 is connected to the pump impeller 162 of the torque converter 16 via a coupling member. If the inner rotor is rotationally driven with the rotation of the pump impeller 162 of the torque converter 16, the outer rotor also rotates as the internal teeth engage with the external teeth, and the rotation of the both rotors results in the hydraulic pressure.

Next, an explanation will be given on a process of engaging the input clutch 122 performed by the ECU 20, mainly during the running of the vehicle 1 equipped with the driving force control apparatus 100 as constructed above. Here, in particular, with reference to a flowchart in FIG. 5, an explanation will be given on a process of engaging the lockup clutch performed by the ECU before the start of the engagement of the input clutch 122 (refer to the step S107 in FIG. 2).

Figure 5:
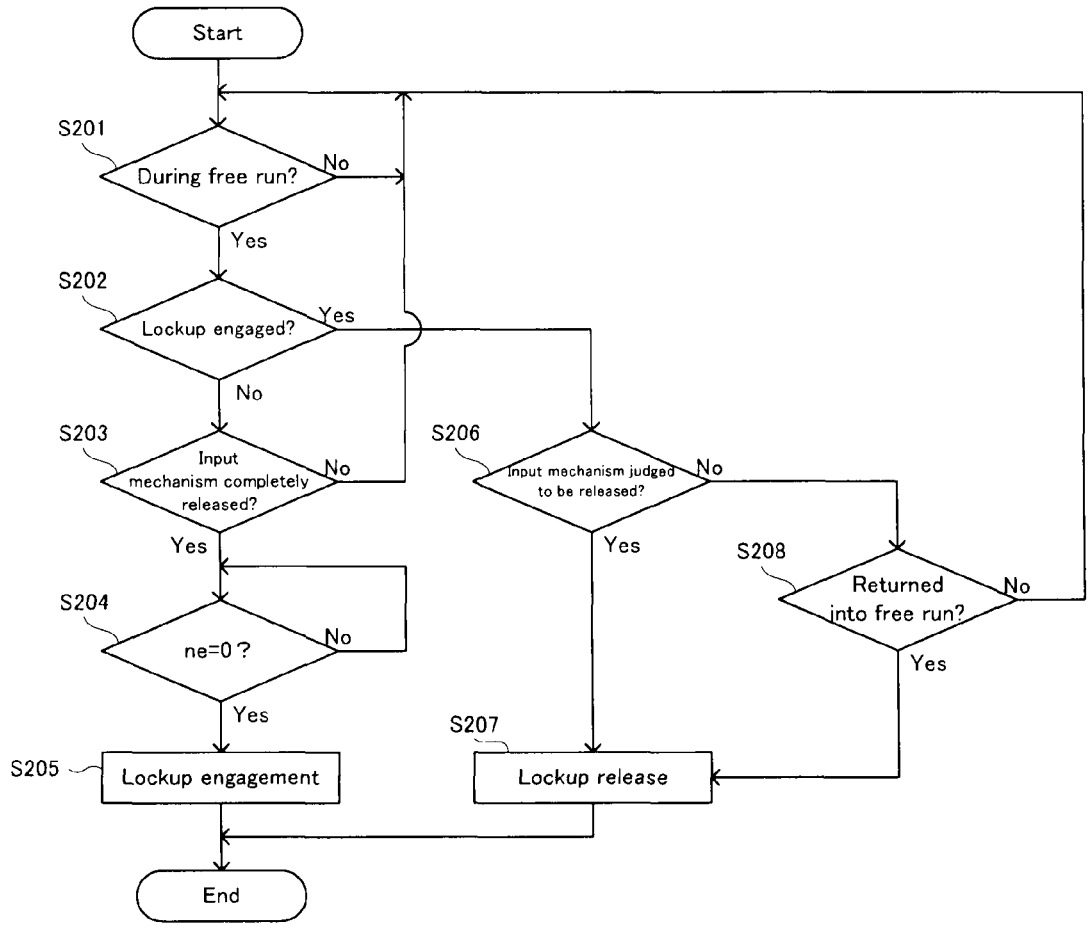
FIG. 5 is a flowchart showing a process of engaging a lock-up clutch performed by the ECU, mainly during the running of the vehicle equipped with the driving force control apparatus in the second embodiment.

In FIG. 5, firstly, the ECU 20 judges whether or not the vehicle 1 is in the free-run state (step S201). If it is judged that the vehicle 1 is not in the free-run state (the step S201:No), the ECU 20 performs the process in the step S201 again.

On the other hand, if it is judged that the vehicle 1 is in the free-run state (the step S201:Yes), the ECU 20 judges whether or not the lockup clutch is engaged (step S202). If it is judged that the lockup clutch is not engaged (the step S202: No), the ECU 20 judges whether or not the input clutch 122 is completely released (step S203).

If it is judged that the input clutch 122 is not completely released (the step S203: No), the ECU 20 performs the process in the step S201. On the other hand, if it is judged that the input clutch 122 is completely released (the step S203: Yes), the ECU 20 judges whether or not the number of revolutions of the engine 11 is zero (step S204).

If it is judged that the number of revolutions of the engine 11 is not zero (the step S204: No), the ECU 20 performs the process in the step S204 again. On the other hand, if it is judged that the number of revolutions of the engine 11 is zero (the step S204: Yes), the ECU 20 engages the lockup clutch (step S205).

In the embodiment, the lockup is engaged before the start of the engagement of the input clutch 122 in the step S107 in FIG. 2, so that when the input clutch 122 is engaged, it is possible to reduce a period until the shift transmission of the automatic transmission 12 is ended in comparison with a case where the lockup clutch is engaged. In addition, the engagement of the lockup clutch can block an oil flow in the torque converter 16, so that an effect of reducing a consumption flow volume can be expected.

In the process in the step S202, if it is judged that the lockup clutch is engaged (the step S202: Yes), the ECU 20 judges whether or not the input clutch 122 is released (step S206). If it is judged that the input clutch 122 is released (the step S206: Yes), the ECU 20 releases the lockup clutch (step S207).

On the other hand, if it is judged that the input clutch 122 is not released (the step S206: No), the ECU 20 judges whether or not the vehicle 1 has returned into the free-run state (step S208). If it is judged that the vehicle 1 has returned into the free-run state (the step S208: Yes), the ECU 20 performs the process in the step S207. If it is judged that the vehicle 1 has not returned into the free-run state (the step S208: No), the ECU 20 performs the process in the step S201.

If the input clutch 122 is engaged, the mechanical oil pump 13 is operated, and the shift transmission of the automatic transmission 12 is performed before the input clutch 122 is released, then, it is possible to limit or control a reduction in the number of revolutions of the engine 11 due to the release of the lockup clutch, and to limit or control a change in acceleration due to the release of the input clutch 122. As a result, it is possible to reduce a sense of discomfort, which is extremely useful in practice.

<Third Embodiment>

A third embodiment of the driving force control apparatus of the present invention will be explained with reference to FIG. 6. The third embodiment has the same structure as the first embodiment, except that a criterion associated with the shift transmission of the automatic transmission is different.

Thus, in the third embodiment, the explanation of overlap with the first embodiment will be omitted, and common parts in the drawings will carry the same reference numeral, and only basically different points will be explained with reference to FIG. 6.

According to the study of the present inventors, the following matter has been found; namely, if the shift transmission of the automatic transmission 12 is performed in the same manner as normal times in the free-run state of the vehicle 1, a shift transmission frequency increases, and the consumption of the operation oil flow volume becomes relatively large. Moreover, as described above, in the free-run state, there arises a need to rotate the engine 11 by using the input clutch 122 in order to compensate the deficiency of the hydraulic pressure, in some cases. In this case, if the deficiency of the hydraulic pressure or the like is relatively small (i.e. the target number of revolutions of the engine 11 is relatively small), there is a possibility that controllability deteriorates.

Figure 6:
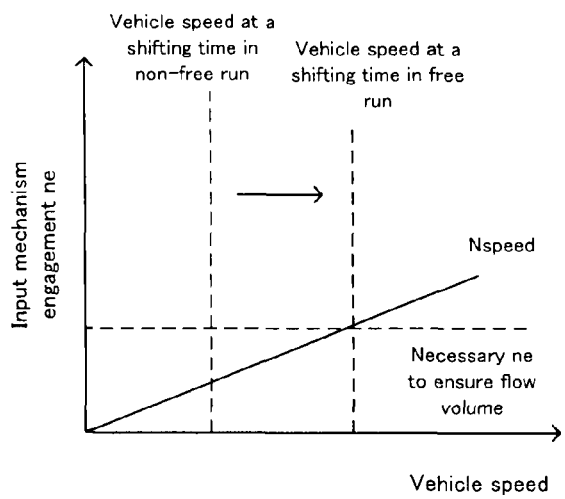
FIG. 6 is a diagram showing one example of a relation between a vehicle speed at a shifting time and the number of revolutions of an engine in the input clutch engagement.

Thus, in the embodiment, as shown in FIG. 6, the shift transmission line in the free-run state of the vehicle 1 is set to differ from normal times (i.e. in a non-free-run state). By this, the deterioration in controllability can be prevented. In addition, up-shifting and down-shifting are performed at a higher vehicle speed than normal times, so that it is possible to avoid a case where even the complete engagement of the input clutch 122 cannot compensate the deficiency of the hydraulic pressure or the like.

Incidentally, FIG. 6 is a diagram showing one example of a relation between a vehicle speed at a shifting time and the number of revolutions of the engine in the input clutch engagement.

FIRST MODIFIED EXAMPLE

A first modified example of the driving force control apparatus in the embodiment will be explained with reference to FIG. 7.

Figure 7:
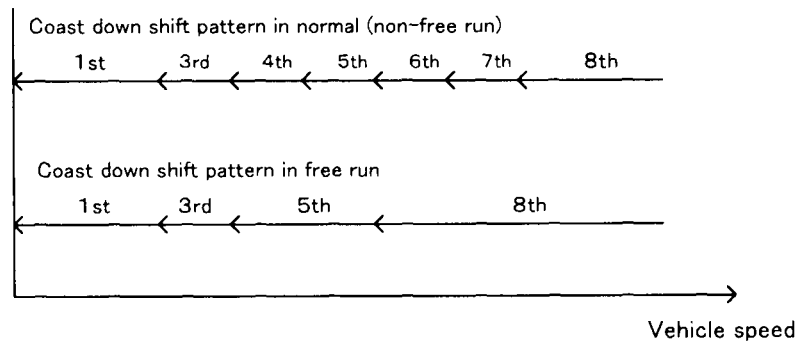
FIG. 7 is a diagram showing one example of a coast-down shift pattern in a case where the automatic transmission is a stepped automatic transmission.

FIG. 7 is a diagram showing one example of a coast-down shift pattern in a case where the automatic transmission is a stepped automatic transmission.

In the case where the automatic transmission is the stepped automatic transmission, as shown in FIG. 7, the number of shifting gears is reduced by performing the shift transmission with shift stages skipped in a range that does not cause a sense of discomfort. By this, it is possible to limit or control the consumption of the operating oil flow volume.

SECOND MODIFIED EXAMPLE

A second modified example of the driving force control apparatus in the embodiment will be explained with reference to FIG. 8.

Figure 8:
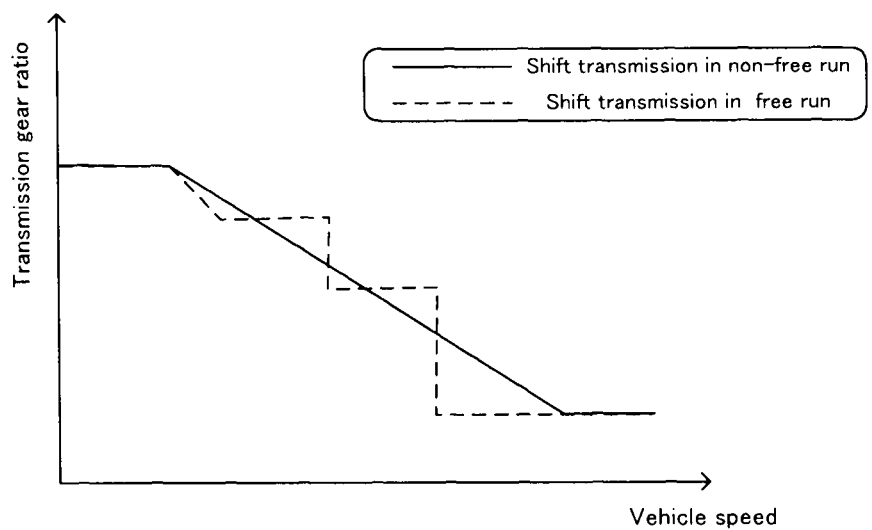
FIG. 8 is a diagram showing one example of the coast-down shift pattern in a case where the automatic transmission is a continuously variable transmission.

FIG. 8 is a diagram showing one example of the coast-down shift pattern in a case where the automatic transmission is a continuously variable transmission.

In the case where the automatic transmission is the continuously variable transmission, as shown in FIG. 8, the number of shifting gears is reduced by fixing a transmission gear ratio in a certain vehicle-speed range.

The present invention is not limited to the aforementioned embodiment, but various changes may be made, if desired, without departing from the essence or spirit of the invention which can be read from the claims and the entire specification. A driving force control apparatus, which involves such changes, is also intended to be within the technical scope of the present invention.

DESCRIPTION OF REFERENCE CODES 1 vehicle
11 engine
12 automatic transmission
13 mechanical oil pup
14 electrical oil pump
15 electrical storage apparatus
16 torque converter
20 ECU
100 driving force control apparatus
122 input clutch

The invention claimed is:

1. A driving force control apparatus mounted on a vehicle, said driving force control apparatus comprising:
   an engine;
   an automatic transmission;
   an engaging device, which has engaging elements, capable of adjusting an extent of transmission of power between said engine and said automatic transmission in accordance with a degree of engagement between engaging elements;
   a mechanical oil pump for generating a hydraulic pressure by rotation of a drive shaft of said engine;
   an electrical oil pump capable of supplying in a hydraulic pressure to said automatic transmission; and
   a controlling device configured to control the degree of the engagement such that power, which makes said mechanical oil pump generate a hydraulic pressure corresponding to a hydraulic difference between a first hydraulic pressure and a second hydraulic pressure, is transmitted to said engine in a condition that the first hydraulic pressure does not reach the second hydraulic pressure when shift transmission of said automatic transmission is performed in a free-run state in which the vehicle runs in a case where said engine is stopped and where the transmission of the power between said engine and said automatic transmission is blocked by said engaging device, wherein the first hydraulic pressure is a hydraulic pressure of said automatic transmission supplied by said electrical oil pump and the second hydraulic pressure is a hydraulic pressure required to perform the shift transmission.

2. The driving force control apparatus according to claim 1, wherein said controlling device controls the degree of the engagement such that power, in accordance with a target number of revolutions of said engine in which said mechanical oil pump generates the hydraulic pressure corresponding to the hydraulic difference, is transmitted to said engine.

3. The driving force control apparatus according to claim 1, further comprising a torque converter which is disposed between said engine and said engaging device and which has a lockup clutch, said controlling device further engaging the lockup clutch in a condition that the number of revolutions of said engine is zero when the vehicle moves into the free-run state.

* * * * *